United States Patent
Yue et al.

(10) Patent No.: US 7,072,585 B2
(45) Date of Patent: *Jul. 4, 2006

(54) PER-CHANNEL OPTICAL AMPLIFICATION USING SATURATION MODE

(75) Inventors: Chaoyu Yue, Dobbs Ferry, NY (US); Paul Green, Mount Kisco, NY (US)

(73) Assignee: Tellabs Operations, Inc., Naperville, IL (US)

( * ) Notice: Subject to any disclaimer, the term of this patent is extended or adjusted under 35 U.S.C. 154(b) by 163 days.

This patent is subject to a terminal disclaimer.

(21) Appl. No.: 10/808,443

(22) Filed: Mar. 25, 2004

(65) Prior Publication Data

US 2004/0179846 A1 Sep. 16, 2004

Related U.S. Application Data

(63) Continuation of application No. 09/461,052, filed on Dec. 15, 1999, now Pat. No. 6,735,394.

(51) Int. Cl.
*H04B 10/17* (2006.01)

(52) U.S. Cl. .......................... 398/92; 398/37; 398/157; 359/349; 359/337.13

(58) Field of Classification Search ............ 398/37–38, 398/92, 94, 157; 359/337.13, 349, 341.3
See application file for complete search history.

(56) References Cited

U.S. PATENT DOCUMENTS

| | | | |
|---|---|---|---|
| 5,185,826 A | 2/1993 | Delavaux | 385/24 |
| 5,241,414 A | 8/1993 | Giles et al. | 359/341.33 |
| 5,392,154 A | 2/1995 | Chang et al. | 359/341.3 |
| 5,452,116 A | 9/1995 | Kirkby et al. | 359/124 |
| 5,506,723 A | 4/1996 | Junginger | 359/341 |
| 5,721,637 A | 2/1998 | Simon et al. | 359/344 |
| 5,724,167 A | 3/1998 | Sabella | 359/128 |
| 5,745,283 A | 4/1998 | Inagaki et al. | 359/341 |
| 5,815,613 A | 9/1998 | Fatehi et al. | 385/22 |
| 5,872,650 A | 2/1999 | Lee et al. | 359/341 |
| 5,912,761 A | 6/1999 | Jander et al. | 359/341 |
| 5,920,423 A | 7/1999 | Grubb et al. | 359/341 |
| 5,933,271 A | 8/1999 | Waarts et al. | 359/341 |

(Continued)

FOREIGN PATENT DOCUMENTS

EP 0 585 005 A1 2/1994

(Continued)

OTHER PUBLICATIONS

Eskildsen L. et al., *Optical Amplifiers for WDM Systems and Networks (U)*, Proceedings of the Military Communications Conference (MILCOM), Long Branch, NJ, Oct. 2-5, 1994, New York, IEEE, US, vol. 2, pp. 350-357.

*Primary Examiner*—Leslie Pascal
(74) *Attorney, Agent, or Firm*—Fitzpatrick, Cella, Harper & Scinto

(57) ABSTRACT

An optical communication system includes a plurality of optical channels, each of which passes a single optical wavelength signal. Each of the plurality of optical channels includes an optical amplifier which is controlled to operate at a predetermined output power level independent of channel wavelength and input power level by operating each optical amplifier in a saturation mode. Pumping power for operating each optical amplifier in the saturation mode is supplied from shared optical pumps or a plurality of one per channel optical pumps.

19 Claims, 8 Drawing Sheets

U.S. PATENT DOCUMENTS

| | | | |
|---|---|---|---|
| 5,936,763 A | 8/1999 | Mitsuda et al. | 359/341 |
| 6,016,219 A | 1/2000 | Fatehi et al. | 359/341 |
| 6,134,034 A | 10/2000 | Terahara | 359/124 |
| 6,339,495 B1 | 1/2002 | Cowle et al. | 359/341.4 |
| 6,359,728 B1 | 3/2002 | Angellieri et al. | 330/345 |
| 6,515,777 B1 | 2/2003 | Arnold et al. | 359/128 |
| 6,735,394 B1 * | 5/2004 | Yue et al. | 398/92 |

FOREIGN PATENT DOCUMENTS

| | | |
|---|---|---|
| EP | 0 896 448 A2 | 2/1999 |
| EP | 0903882 A2 | 3/1999 |
| WO | WO 99/07096 | 2/1999 |

* cited by examiner

PER-CHANNEL OPTICAL AMPLIFICATION USING SATURATION MODE

This application is a continuation U.S. application Ser. No. 09/461,052, filed Dec. 15, 1999 now U.S. Pat. No. 6,735,394.

FIELD OF THE INVENTION

The invention is in the field of optical telecommunications, and more particularly, pertains to an optical communication system in which individual channel output power levels are equalized independent of channel wavelength and input power level.

BACKGROUND OF THE INVENTION

In Wavelength Division Multiplexed (WDM) optical links it is difficult to assure that signals arriving at each channel's photodetector have a power level that is within the receiver's dynamic range. Even for simple point-to-point links, flattening filters are used in the Erbium Doped Fiber Amplifiers (EDFA's), MUX/DEMUX components' profiles of attenuation vs. wavelength must be trimmed, and the system must be carefully monitored to ensure that large inter-channel differences in concatenated connector and splice losses are not accumulated.

Typically, all WDM channels are amplified in a single amplifier, with the single amplifier being optimized for gain flatness. However, there are different power levels in each channel due to differences in accumulated channel losses at different frequencies. Variable Optical Attenuators (VOA's) are used in the respective channels to compensate for the losses. The VOA's require frequent adjustment to maintain required power levels, and if the power level in a given channel drops below a minimum level, a transponder is required in the line to increase the power level to the required level.

Thus, there is a need to be able to automatically readjust the power level on a per-channel basis so that the photodetector at the optical receiver receives a signal with an adequate Optical Signal to Noise Ratio (OSNR) and amplitude to achieve a desired Bit Error Rate (BER), but not so high a power level that the optical receiver or the electronics to follow are saturated.

SUMMARY OF THE INVENTION

In view of the above, it is an aspect of the invention to adjust the power levels in an optical communication system on a per-channel basis.

It is another aspect of the invention to adjust the power levels in an optical communication system on a per-channel basis by including in each channel an optical amplifier which is operated in the saturation mode.

It is yet another aspect of the inventions to adjust the power levels in an optical communication system on a per-channel basis by including in each channel an optical amplifier, with each such amplifier receiving a predetermined pump power for operating each such amplifier in the saturation mode.

It is still another aspect of the invention to connect Optical Line Terminals (OLT's) back-to-back at their respective pass-through interface channels, with each channel including an optical amplifier, with each such amplifier receiving a predetermined pump power for operating each such amplifier in the saturation mode.

It is still yet another aspect of the invention to adjust the power levels in each output channel from a demultiplexer in a WDM optical communication system on a per-channel basis, with each such output channel including an optical amplifier, with each such amplifier receiving a predetermined pump power for operating each such amplifier in the saturation mode, with the pump power being provided from either a predetermined power per-channel pump for each amplifier, or a single shared pump which supplies the predetermined power to each channel amplifier, wherein one or more of the pumps also are referred to as a "controller".

It is a further aspect of the invention to adjust the power levels in each input channel to a multiplexer in a WDM optical communication system on a per-channel basis, with each such input channel including an optical amplifier, with each such amplifier receiving a predetermined pump power for operating each such amplifier in the saturation mode, with the pump power being provided from either a predetermined power per-channel pump for each amplifier, or a single shared pump which supplies the same predetermined power to each channel amplifier.

It is yet another further aspect of the invention to maximize the number of optical hops in an optical ring network by equalizing the output power level in the respective channels due operating the respective channel amplifiers at a predetermined power level by operating the amplifiers in the saturation mode.

It is still yet another further aspect of invention to prevent lasing in an optical ring network by operating an amplifier in each channel at a predetermined power level which can't be exceeded, such that one channel can't rob another channel of power due to the one channel's wavelength traversing the loop without being dropped.

DETAILED DESCRIPTION

Figure 1:
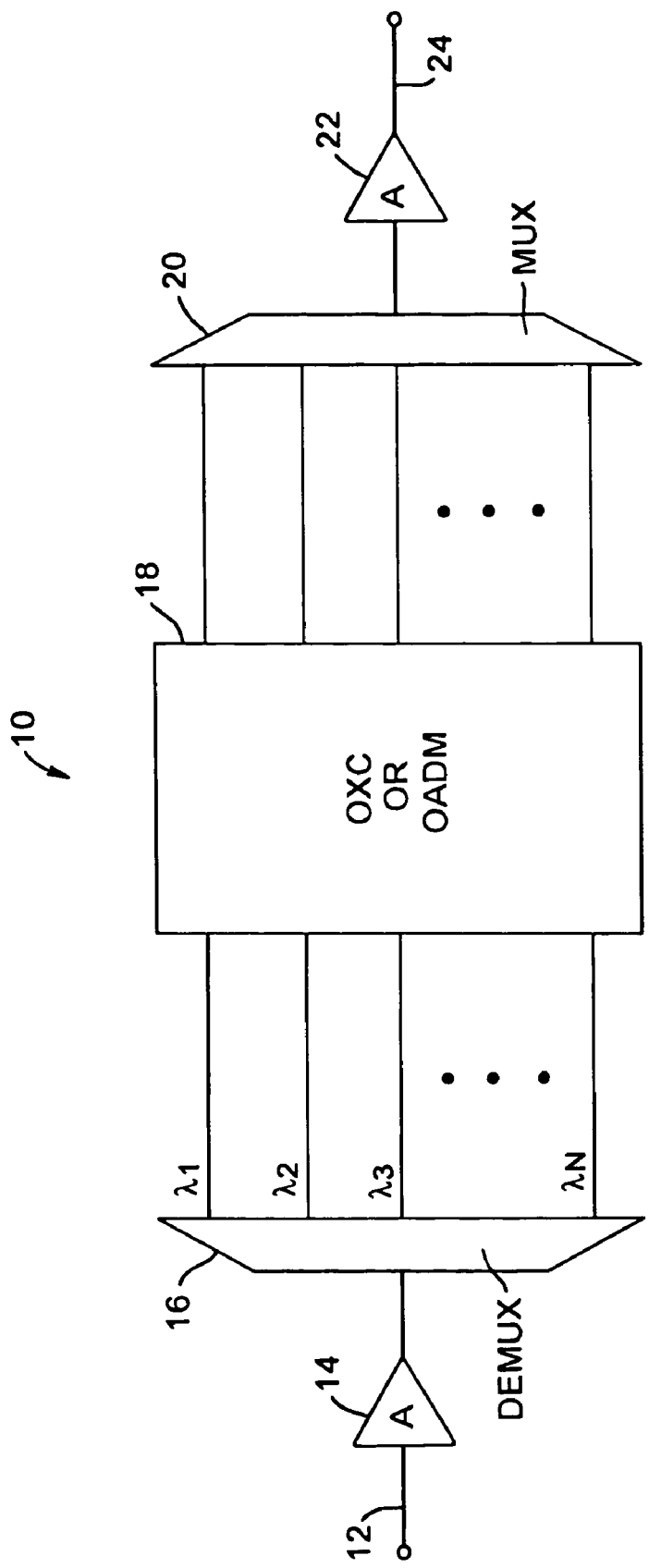
FIG. 1 is a block diagram of a prior art optical communication system.

FIG. 1 is a block diagram of a prior art optical communication system 10 in which an optical facility signal comprising multiple channels of different wavelengths is input on a single fiber 12 to an optical amplifier 14 with flat gain which amplifies the input signal. The amplified optical facility signal is then demultiplexed by a demultiplexer 16 into its constituent wavelengths $\lambda 1$–$\lambda m$, and is applied to an Optical Cross Connect Switch (OXC) or Optical Add Drop Multiplex (OADM) 18, and then to a multiplexer 20 which multiplexes the wavelengths $\lambda 1$–$\lambda m$ to form an optical facility signal comprising the multiple wavelengths λ1–λm which is then amplified by an optical amplifier 22 which is identified to optical amplifier 14, which then outputs the amplified facility signal on output fiber 24. Wavelengths are not shown as being added/dropped in the drawing, however, this is understood by those skilled in the art.

In general, even though the optical amplifiers 14 and 22 have a flat gain, the amplitudes of the individual wavelengths are often different and require adjustment to attempt to equalize the gain of the respective channels. This equalization is typically accomplished using VOA's which are inserted in the respective channels. In addition, the OXC or OADM 18 introduces losses on the order of 1–5 db, which are reflected in the output power level of the respective channels. If the output power level in a given channel is below a threshold level, an expensive transponder is required to raise the power level above the threshold.

Figure 2:
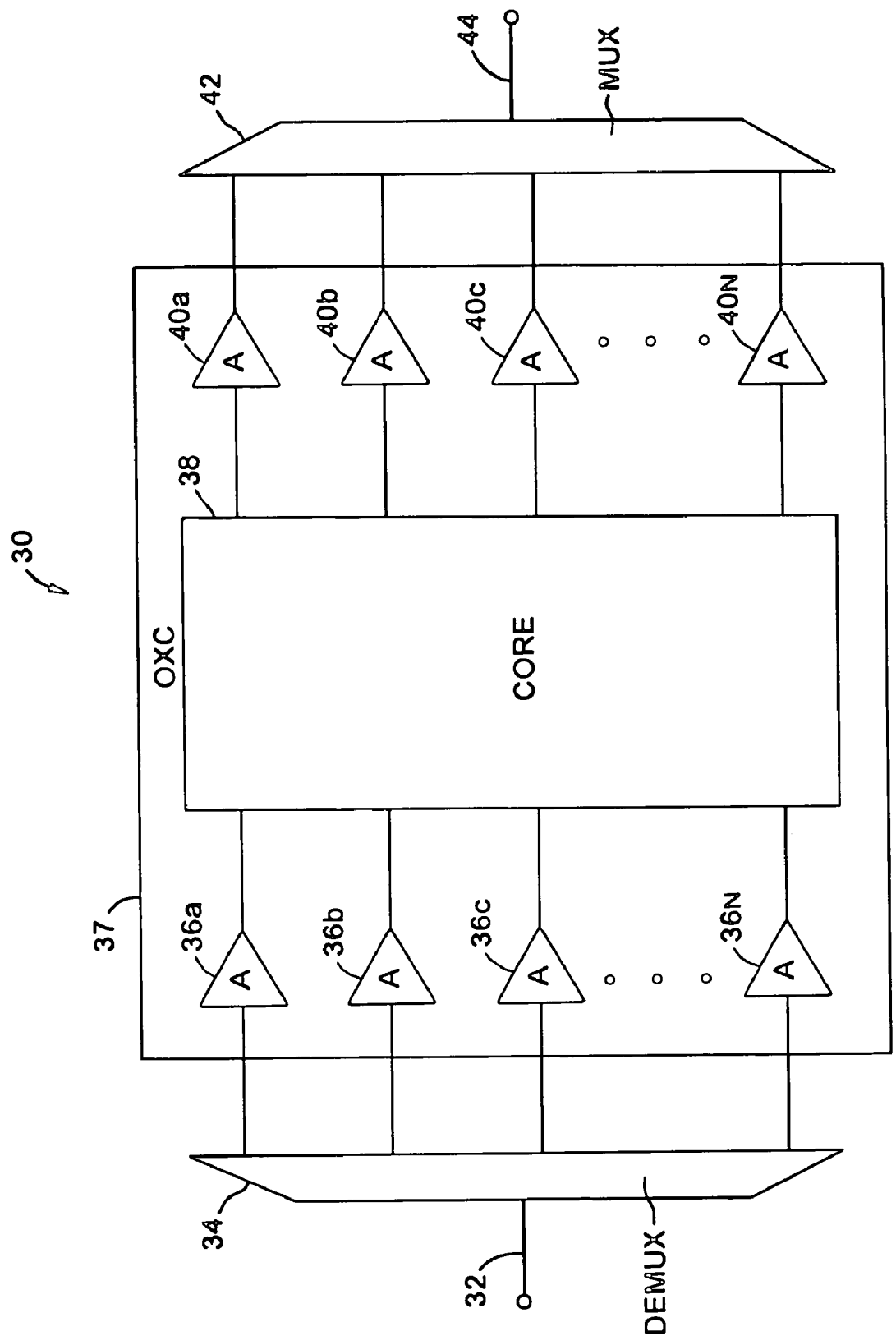
FIG. 2 is a block diagram of an optical communication system according to the present invention.

FIG. 2 is a block diagram of an optical communication system according to the present invention, in which the output power of each channel is equalized independent of the channel wavelength and input power level. This is accomplished by including an optical amplifier in each channel which is controlled to operate at a predetermined power level, by operating each optical amplifier in a saturation mode. The optical amplifier is termed an "amplet" which is a low-cost optical amplifier using low-cost laser pumps, in comparison to the amplifier and pumps used for amplifying multiple wavelength facility signals.

In FIG. 2, an optical communication system 30 has an optical facility signal comprising multiple channels of different wavelengths input on a single fiber 32 demultiplexed into its constituent wavelengths λ1–λn by a demultiplexer 34, which are then applied to optical amplifiers 36a–36n, respectively in an OXC 37. Although FIG. 2 shows only one input and one output fiber, each bearing n wavelengths, in general there may be more than one such input fiber and one such output fiber and associated demultiplexers and multiplexers, respectively. The output power level of each of the optical amplifiers 36a–36n is at a predetermined power level independent of channel wavelength and input power level due to those amplifiers also being operated in the saturation mode. This will be described in more detail later with respect to FIGS. 4 and 5. The respective amplified channel wavelengths are then applied to the core 38 of the OXC 37, and then the respective wavelengths are applied from the core 38 to optical amplifiers 40a–40n in OXC 37. The output power level of each of the optical amplifier 40a–40n are each at a predetermined power level due to those amplifiers also being operated in the saturation mode. The respective amplified channel wavelengths from OXC 37 are then multiplexed by multiplexer 42 into a multiple channel facility signal which is output on a single fiber 44.

Figure 3:
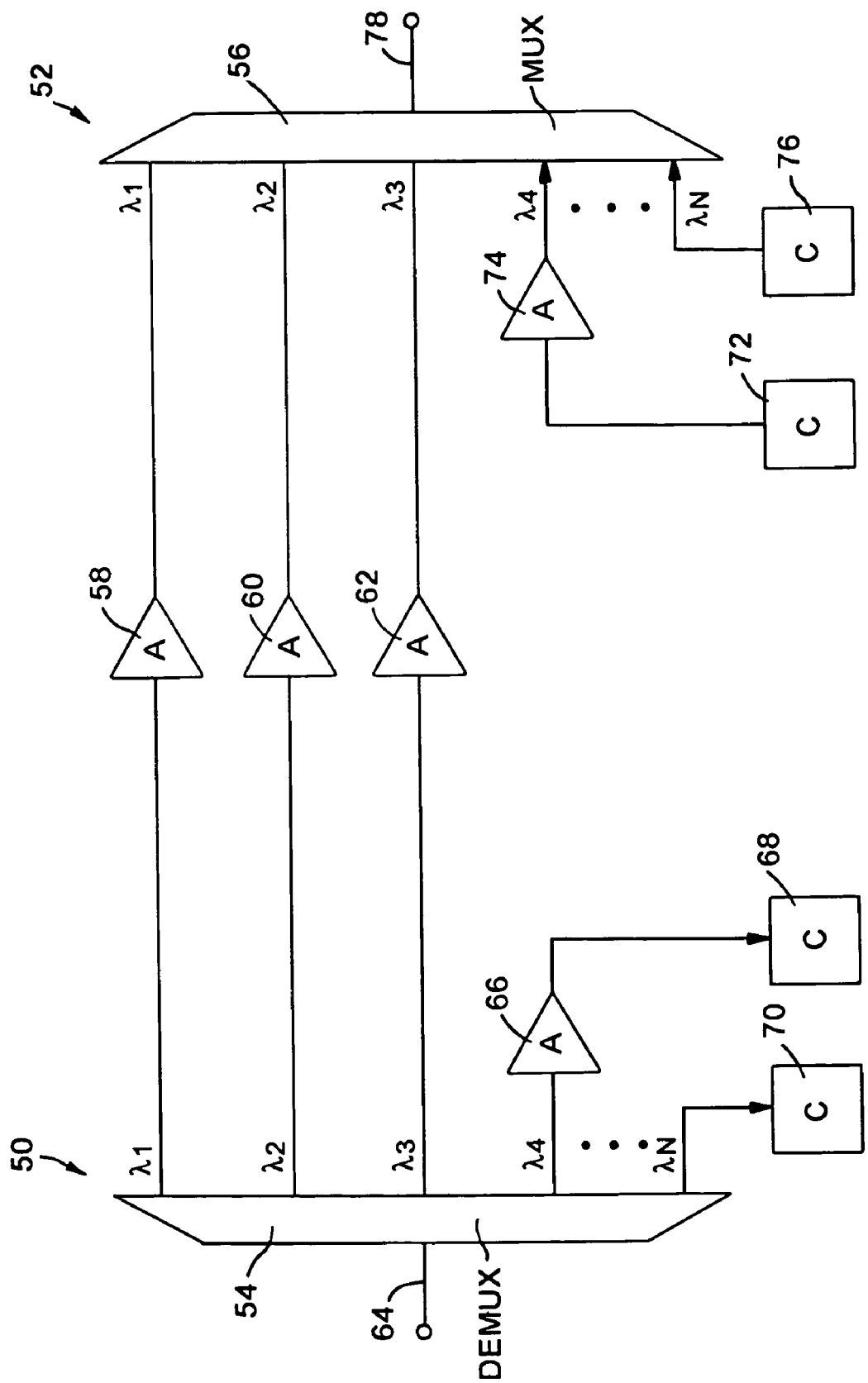
FIG. 3 is a block diagram of a WDM optical communication system according to the present invention.

FIG. 3 is a block diagram of a WDM optical communication system in which OLT's 50 and 52 are connected back-to-back to form an OADM. It is to be appreciated that there is another OADM (not shown) for optical signal flow in the opposite direction. Demultiplexer 54 and multiplexer 56 are connected back-to-back via the channels including optical amplifiers 58, 60 and 62. A multiple channel facility signal is input on a single fiber 64 and is demultiplexed into its constituent wavelengths λ1–λn Rn by demultiplexer 54. Wavelengths λ1, λ2 and λ3 are amplified by amplifiers 58, 60 and 62, respectively, and are input to multiplexer 56. Wavelength λ4 is amplified by an optical amplifier 66 and is dropped off at a client equipment 68. Wavelength λn is dropped off at a client equipment 70 without amplification. A client equipment 72 provides a wavelength λ4 to multiplexer 56 via an amplifier 74, and a client equipment 76 provides an unamplified signal λm to multiplexer 56. The multiplexer 56 then outputs a multiple channel facility signal on a single output fiber 78. The client equipment may be any one of a computer, a SONET terminal, a telephone switch, a central office switch for telephones, a digital cross-connect switch, an end device such as a terminal, or the like. Each of the optical amplifiers 58, 60, 62, 66 and 74 are operated in the saturation mode so that their respective output power levels are at a predetermined power level. It is to be appreciated that the channels to client equipments 70 and 76 may also include optical amplifiers.

Figure 4:
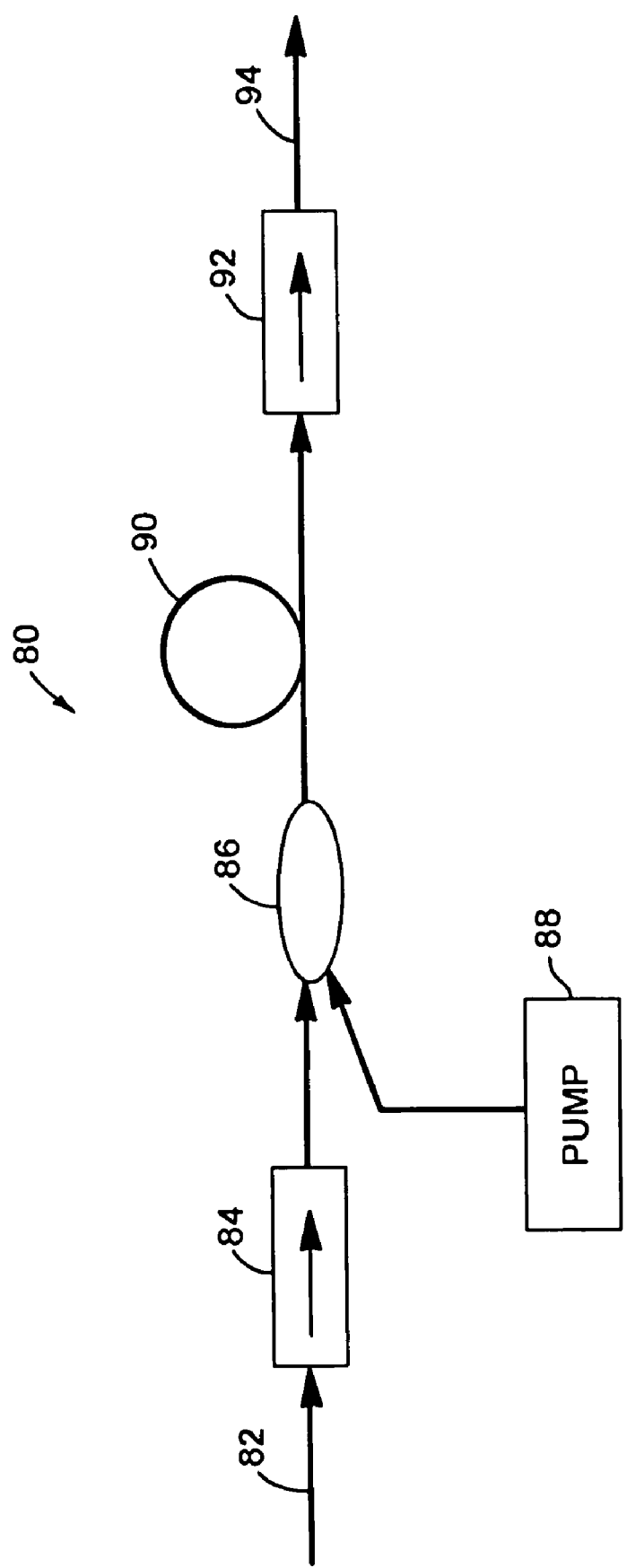
FIG. 4 is a block diagram of one amplifier constituting an optical channel according to the present invention.

FIG. 4 is a block diagram of a single optical channel according to the present invention. An individual wavelength λx is input on a single fiber 82 and passed by an isolator 84 to a coupler 86 which combines λx with the light output λp from a laser pump 88. The laser pump 88 has pumping power sufficient to cause EDFA 90 to operate in the saturation mode so that its output power level is at a predetermined level. The amplified optical wavelength λx is then passed by an isolator 92 to a single output fiber 94.

Figure 5:
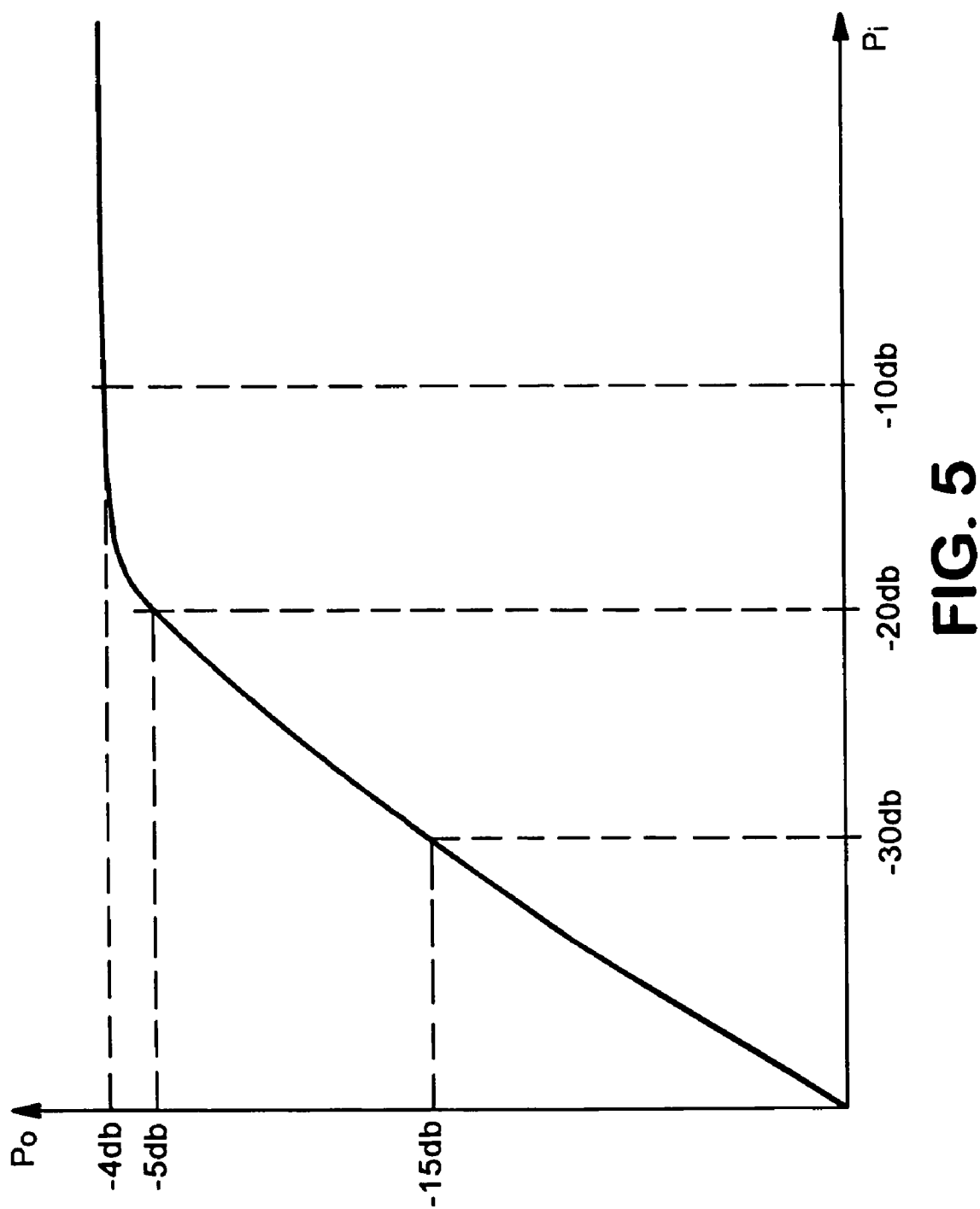
FIG. 5 is a typical graph of power-in versus power-out for the optical amplifier 90 shown in FIG. 4.

FIG. 5 is a typical graph of power-in (Pi) versus power-out (Po) for the optical amplifier 90 of FIG. 4. It is seen that for an input power level of −30 db the output power level is −15 db on the steep part of the curve, and for an input power level of −20 db the output power level is −5 db. Thus, it is seen that for a 10 db difference in input power level there is a 10 db difference in output power level, which difference in power level would have to be subsequently compensated for by a VOA or the use of a transponder in the prior art.

In contrast, it is seen that when operating on or near the flat portion of the curve the output power is substantially the same for different input power levels due to operating on the saturation part of the curve. For example, for an input power level of −10 db the output power level is −4 db. Thus, it is seen for a 10 db difference between input power levels of −20 db and −10 db there is only a 1 db difference between the output power levels of −5 db and −4 db, respectively. Accordingly, it seen that if amplifiers in different channels are each operating in the saturation mode their respective output power levels will be at a predetermined level which is substantially the same level for each amplifier.

Figure 6:
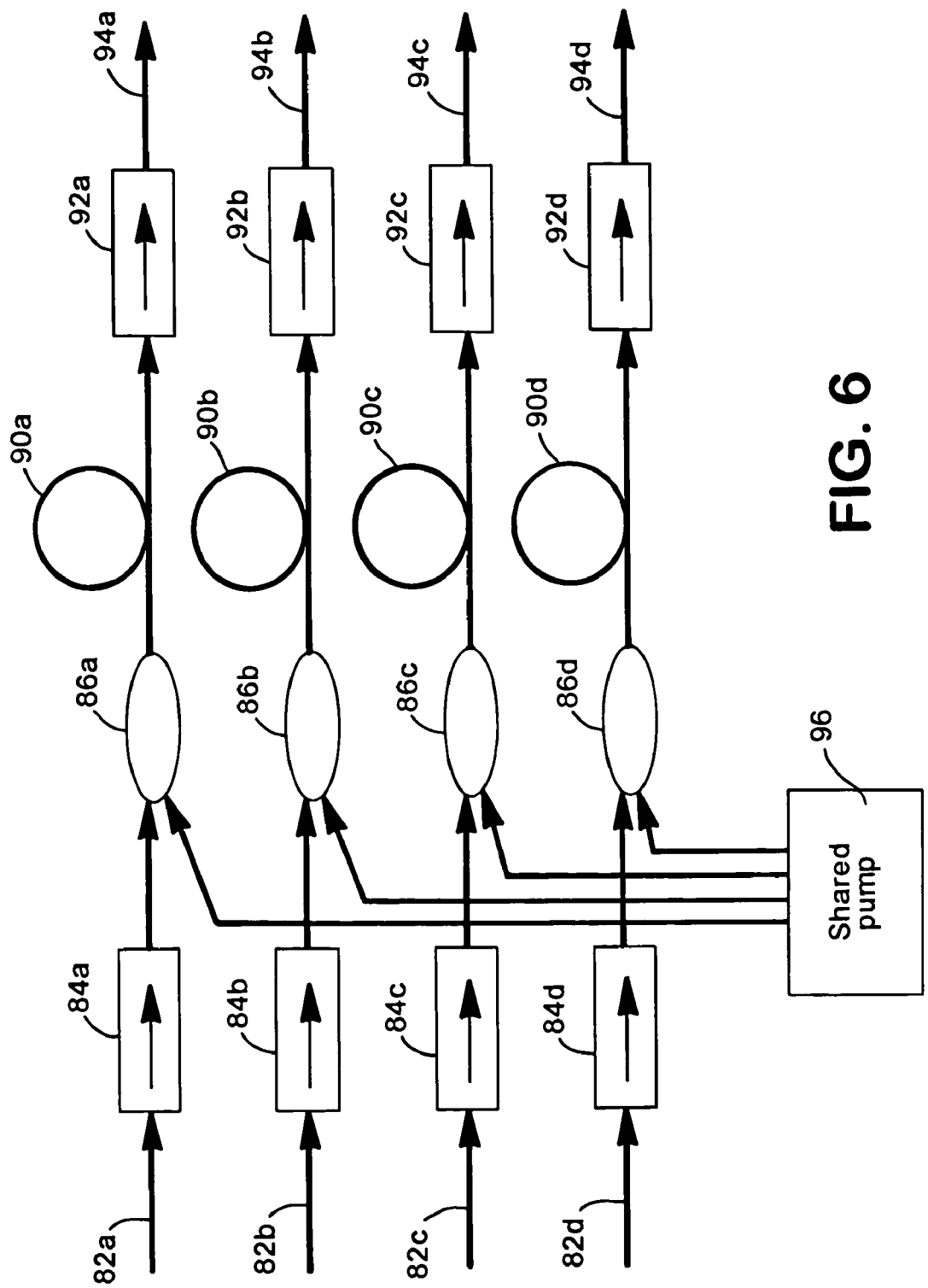
FIG. 6 is a block diagram of a plurality of optical channels whose optical amplifiers receive pumping power from a shared optical pump.

This is seen more clearly with respect to FIG. 6 in which four optical channels for four different wavelengths are shown. Each such channel is identical to the channel 80 shown in FIG. 4, with a shared laser pump 96 providing the same pumping power at λp to each of the isolators 86a–86d, to operate each of the optical amplifiers 90a–90d in the saturation mode so that their respective output power levels are at substantially the same predetermined power level independent of channel wavelength and input power level. It is understood that the shared pump 96 provides the same pumping power to each of the couplers 86a–86d via an optical splitter (not shown).

Figure 7:
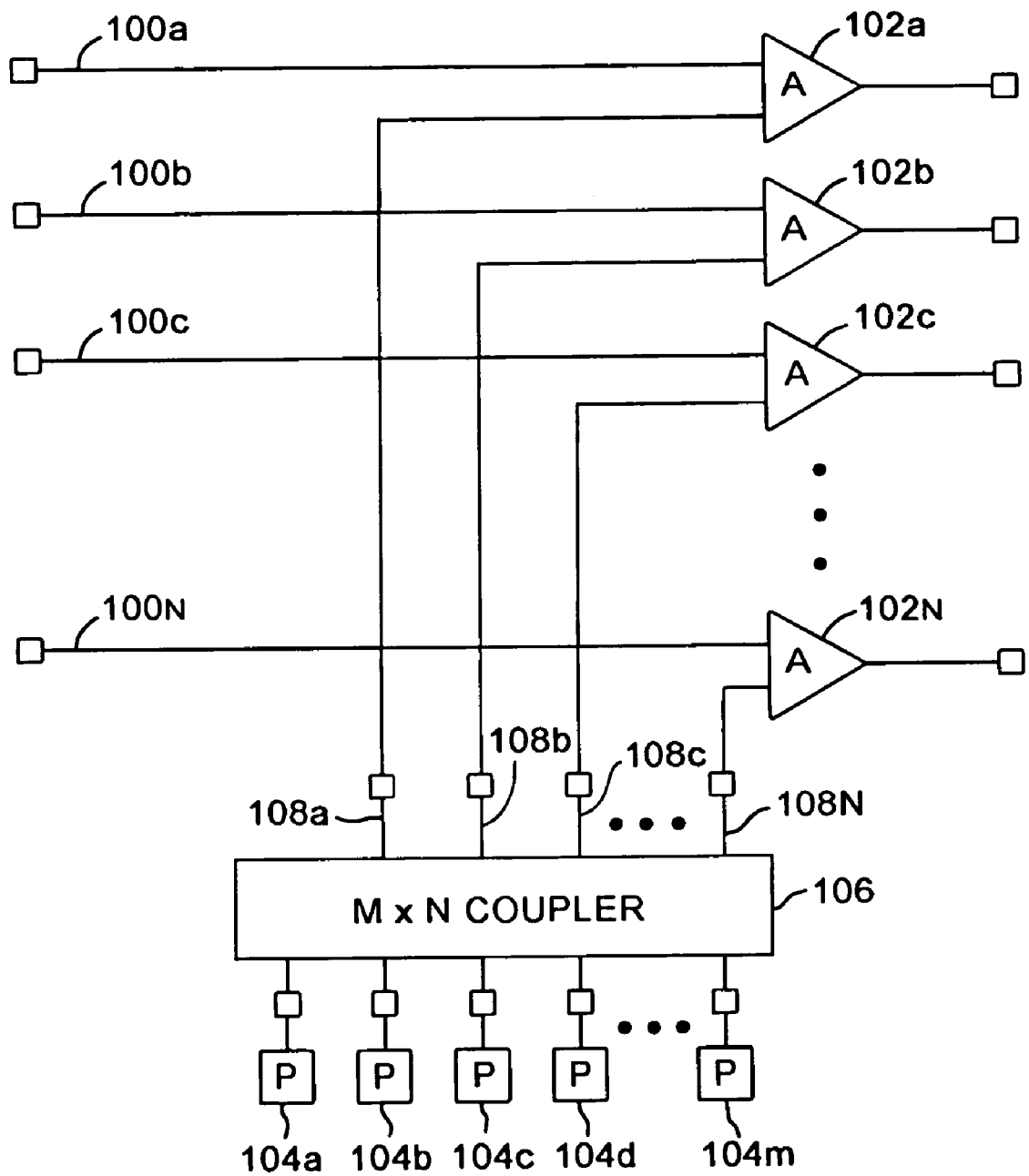
FIG. 7 is a block diagram of how to couple a plurality of optical pumps to the optical amplifiers of a plurality of optical channels.

FIG. 7 is a block diagram of another pump configuration in which a plurality of optical pumps are coupled to a plurality of channel amplifiers via a coupler. Channels 100a–100n include optical amplifiers 102a–102n. Pumping power for the amplifiers 102a–102n are selectively provided by laser pumps 104a–104m via an M×N coupler 106 and lines 108a–108n, respectively. The number of channels is equal to N, and the number of pumps is equal to M, where M and N are integers, and M is not equal to N.

For example, if there are 32 channels and each channel requires 20 MW of power, a 4×32 coupler can be used, with each of the 4 pumps providing 160 MW of power. Thus, each pump splits power between 8 of the 32 channels.

In the configuration shown in FIG. 7, one or more of the pumps 104a–104m may be a spare pump for use in the event of another one of the pumps becoming inoperative.

It is understood that there may be a single pump per channel, with the pump power being the same or different for the respective amplifiers. If the pump powers are different, it is understood that the respective amplifiers have different saturation levels.

Also, it is understood that there may be multiple shared pumps used in the practice of the invention. For example, if there are 32 channels there may be 16 pumps, with 2 channels sharing a pump; or 8 pumps with 4 channels sharing a pump; or 4 pumps with 8 channels sharing a pump, and so on.

Figure 8:
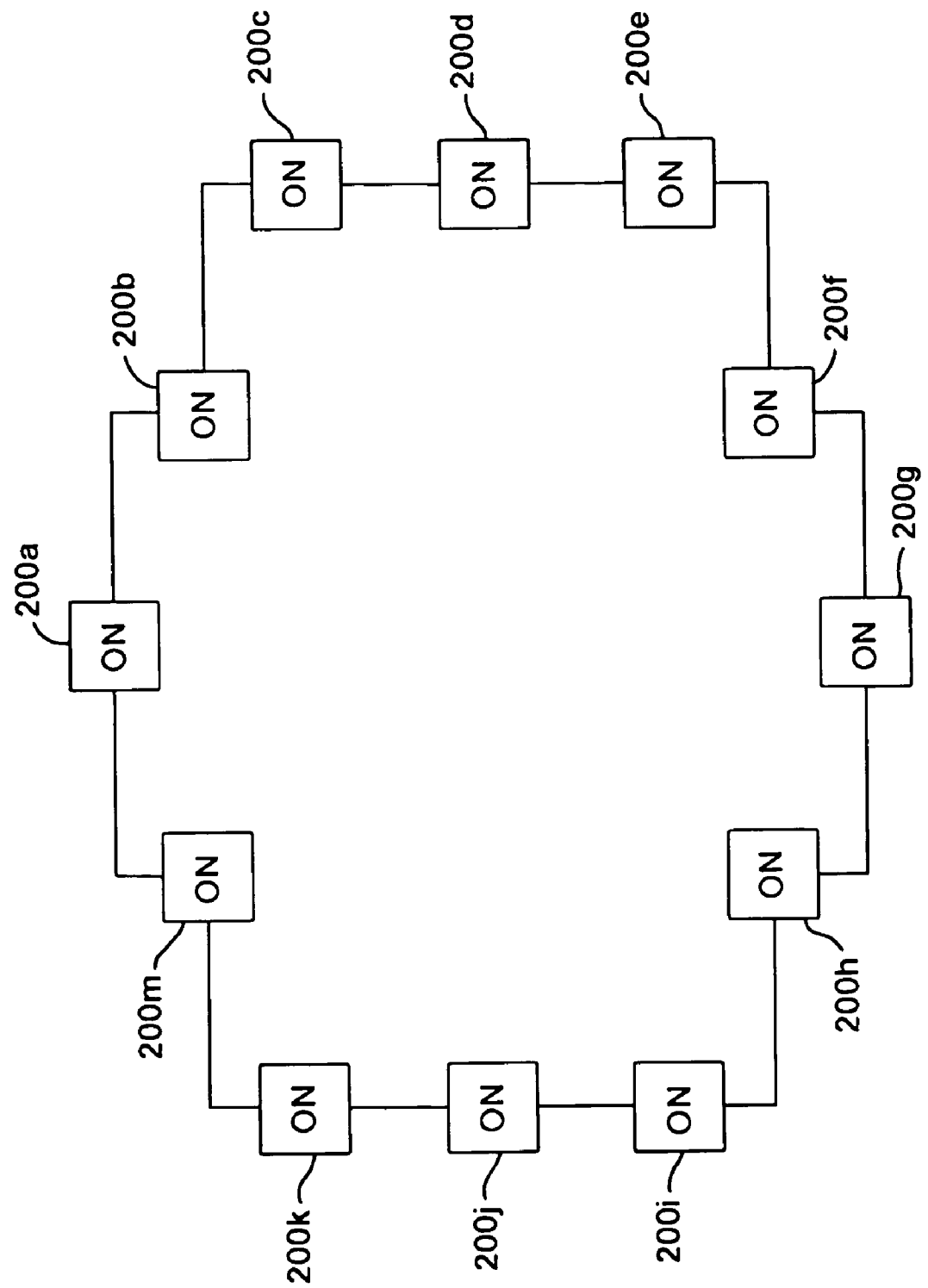
FIG. 8 is a block diagram of a plurality of optical nodes connected in a ring configuration.

FIG. 8 is a block diagram of a plurality of optical nodes 200a–200l connected in a ring configuration. The respective optical nodes may comprise OLT's, OADM's, or the like. An optical signal transmission from one node to the next is termed a hop. If the optical nodes are OLT's connected back-to-back according to the prior art, up to five hops may be made without introduction of a transponder in the lightpath. Thus if an optical signal were transmitted from node 200a to node 200m, a transponder would be required at nodes 200f and 200k.

In contrast, according to the present invention, due to the equalization of output power level in the respective channels in the optical ring, due to operating the respective channel amplifiers in the saturation mode, recent modeling results have shown that up to twenty-three hops may be made without introduction of a transponder in the lightpath.

A further advantage that is derived in such an optical ring using amplifiers operating at a predetermined output power level in each of the channels, is the prevention of lasing. Since the power level output of the amplifiers in the respective channels is constrained not to rise above a predetermined level, a given channel's wavelength that traverses the ring without being dropped can't rob power from another channel, due to the respective output power levels of the amplifiers being held at the predetermined level.

Accordingly, system cost is reduced, as fewer expensive transponders are required. Cost of the optical amplifiers are decreased as less gain is required, VOA's are not required, automatic gain control is not required and equalization is not required. System level costs are also decreased as simpler software is required since no VOA control is required. Further, an inadvertent ring connection in a given channel will not cause ringing due to the amplifiers in the channel operating in the saturation mode.

In summary, in the apparatus of the present invention each channel in an optical communication system includes an optical amplifier which operates in the saturation mode such that each amplifier has substantially the same output power level independent of channel wavelength and input power level.

Although certain embodiments of the invention have been described and illustrated herein, it will be readily apparent to those of ordinary skill in the art that a number of modifications and substitutions can be made to the preferred example methods and apparatus disclosed and described herein without departing from the true spirit and scope of the invention.

What is claimed is:

1. A method of operating at least one optical node, comprising the steps of:
    applying optical wavelength signals to inputs of respective ones of a plurality of optical amplifiers; and
    selectively coupling output power of a plurality of optical pumps to selected ones of the optical amplifiers through a coupler, to cause the optical amplifiers to operate in a saturation mode, wherein a saturation level of each optical amplifier is either substantially the same, or different, depending on the output power of each optical pump.

2. The method according to claim 1, wherein the optical amplifiers are arranged in subsets, and the selectively coupling step selectively couples the output power of each of the optical pumps to each optical amplifier of a corresponding one of the subsets.

3. The method according to claim 1, further comprising the step of demultiplexing an optical signal including multiple wavelengths into the optical wavelength signals.

4. The method according to claim 1, wherein the optical amplifiers are arranged in subsets, and each optical amplifier within a same subset receives at least a portion of the output power coupled to that subset by the coupler.

5. An optical node comprising:
    a plurality of optical amplifiers arranged to influence a power level of corresponding channels within an optical signal;
    a plurality of optical pumps; and
    a coupler, arranged to selectively couple output power of the plurality of optical pumps to selected ones of the optical amplifiers, to cause the optical amplifiers to provide an output power level within a saturation mode,
    wherein the output power level of each optical amplifier is either substantially the same, or different, depending on the output power of each optical pump.

6. The optical node according to claim 5, wherein the optical amplifiers are arranged in subsets, and the coupler couples the output power of each of the optical pumps to each optical amplifier of a corresponding one of the subsets.

7. The optical node according to claim 5, wherein the optical amplifiers are arranged in subsets, and each optical amplifier within a same subset receives at least a portion of the output power coupled to that subset by the coupler.

8. The optical node according to claim 5, further comprising a spare optical pump, wherein the coupler is adapted to selectively couple an output power of the spare optical pump to at least one of the optical amplifiers.

9. The optical node according to claim 5, wherein the output power level within the saturation mode prevents lasing in an optical communication system within which the optical node operates.

10. A method for operating an optical communication system, comprising the steps of:
    amplifying a power level of each of a plurality of optical channels within at least one optical node of the optical communication system, through a corresponding plurality of optical amplifiers arranged to amplify respective ones of the optical channels; and
    selectively controlling the power level of each amplifier so that each optical amplifier operates in a saturation mode,
    wherein the optical amplifiers are arranged in subsets, and the controlling couples at least a portion of power output from each of a plurality of pump sources to each optical amplifier within a same subset.

11. The method according to claim 10, further comprising the step of demultiplexing an optical signal including multiple wavelengths into the plurality of optical channels.

12. The method according to claim 10, wherein there are M pump sources and N optical amplifiers.

13. A method according to claim 10, wherein operation of each optical amplifier in the saturation mode enables the optical channels to be successfully communicated through an increased number of hops relative to a case where the optical amplifiers are not operated in the saturation mode.

14. An optical node, comprising:
   a plurality of optical amplifiers arranged to influence a power level of each of a plurality of optical channels; and
   a controller, arranged to selectively control the power level of each optical amplifier so that each optical amplifier operates in a saturation mode,
   wherein the optical amplifiers are arranged in subsets, and the controller couples at least a portion of power output from each of a plurality of pump sources to each optical amplifier within a same subset.

15. The optical node according to claim 14, wherein there are M pump sources and N optical amplifiers.

16. The optical node according to claim 14, wherein operation of each optical amplifier in the saturation mode prevents lasing in an optical communication system within which the optical node operates.

17. The optical node according to claim 14, wherein operation of each optical amplifier in the saturation mode enables the optical channels to be successfully communicated through an increased number of hops relative to a case where the optical amplifiers are not operated in the saturation mode.

18. The optical node according to claim 14, further comprising a core that includes at least one of an optical cross connect switch and an optical add-drop multiplexer, wherein the core is optically coupled to the optical channels.

19. A method for operating an optical communication system having at least one optical node, the method comprising the steps of:
   amplifying a power level of each of a plurality of optical channels of an optical signal through corresponding ones of a plurality of optical amplifiers; and
   providing an output of each of a plurality of optical pumps to each optical amplifier of a corresponding one of a plurality of subsets of the optical amplifiers, to cause the optical amplifiers of the corresponding subset to provide a predetermined output power level.

* * * * *